United States Patent [19]

Washbourn et al.

[11] Patent Number: 4,532,462

[45] Date of Patent: Jul. 30, 1985

[54] ELECTRIC ACTUATORS

[75] Inventors: Jack Washbourn, Chippenham; Howard F. Cogan, Leire, both of England

[73] Assignee: Westinghouse Brake & Signal, England

[21] Appl. No.: 607,635

[22] Filed: May 7, 1984

[30] Foreign Application Priority Data

May 12, 1983 [GB] United Kingdom ............... 8313102
Jun. 23, 1983 [GB] United Kingdom ............... 8317063
Jun. 23, 1983 [GB] United Kingdom ............... 8317064

[51] Int. Cl.³ .............................................. H02K 7/10
[52] U.S. Cl. ................................... 318/372; 318/254;
318/261; 318/696; 318/362; 310/83; 188/162
[58] Field of Search ............. 318/372, 371, 362, 301,
318/261, 269, 273, 614; 310/77, 80, 83;
180/170; 188/162, 158, 74, 33; 246/182 R;
192/1, 116.5, 147, 140; 267/168

[56] References Cited

U.S. PATENT DOCUMENTS

| 212,688 | 2/1879 | Hansell | 267/168 X |
|---|---|---|---|
| 874,219 | 12/1907 | Mahoney | 188/162 X |
| 2,418,351 | 4/1947 | Jackson | 318/261 |
| 2,446,393 | 8/1948 | Russell | 310/83 |
| 2,479,019 | 8/1949 | Ochtman | 310/83 |
| 2,480,212 | 8/1949 | Baines | 310/83 |
| 2,482,464 | 9/1949 | Chapman | 310/83 |
| 2,756,014 | 7/1956 | Leibfried | 267/170 X |
| 3,013,624 | 12/1961 | De Remer et al. | 188/162 X |
| 3,039,758 | 6/1962 | Gratzmuller | 267/168 X |
| 3,159,758 | 12/1964 | Hemperly et al. | 310/83 |
| 3,399,879 | 9/1968 | Hojo et al. | 267/178 |
| 3,659,683 | 5/1972 | Betzing | 188/162 |
| 4,136,304 | 1/1979 | Baechler et al. | 318/372 |
| 4,364,111 | 12/1982 | Jocz | 318/466 X |
| 4,393,319 | 7/1983 | Bock | 310/80 |
| 4,445,075 | 4/1984 | Fry | 318/434 |
| 4,463,291 | 7/1984 | Usry | 318/254 |

FOREIGN PATENT DOCUMENTS 909176 10/1962 United Kingdom .
2071796A 9/1981 United Kingdom .

Primary Examiner—William M. Shoop, Jr.
Assistant Examiner—Shik Luen Paul Ip
Attorney, Agent, or Firm—Larson & Taylor

[57] ABSTRACT

An electric actuator having an electric motor operable to control the output force generated by a spring system of the actuator on an output member of the actuator; measuring means responsive to a characteristic of the spring system which is indicative of the value of the output force; and an electrical circuit by which operation of the electric motor can be initiated and can be terminated when the measuring means detects the characteristic as being indicative of the output force of a required value.

7 Claims, 11 Drawing Figures

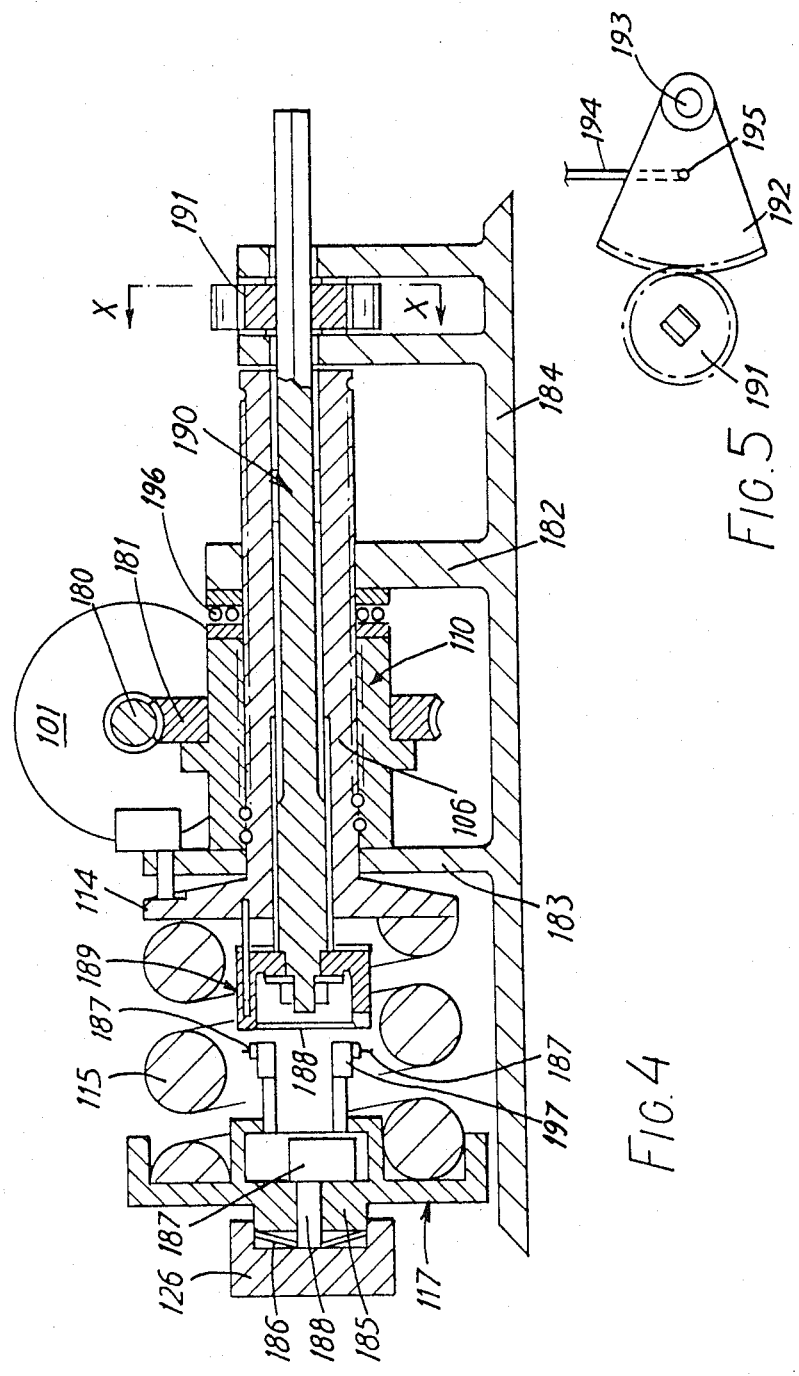

ELECTRIC ACTUATORS

This invention relates to electric actuators.

Electric actuators are known which are of the type in which an electric motor is operable to control the output force generated by a spring system of the actuator on an output member of the actuator. Such actuators are used, for example, as actuators for the brakes of vehicles.

One problem of such actuators is to ensure that the generated output force is to the value required.

Accordingly, the present invention provides an electric actuator having an electric motor operable to control the output force generated by a spring system of the actuator on an output member of the actuator; measuring means responsive to a characteristic of the spring system which is indicative of the value of the output force; and an electrical circuit by which operation of the electric motor can be initiated and can be terminated when the measuring means detects the characteristic as being indicative of the output force being of a required value.

The electric motor may control the output force generated by the spring system by controlling the length of a spring of the system. In this case, the length of the spring may be controlled by the electric motor through a pair of threadedly-engaged relatively-rotatable members rotation of one of which is effected by operation of the electric motor and consequential axial movement of the other determines the length of the spring. The spring may be a power spring which generates the output force and is the sole spring of the spring system or it may be a control spring, the spring system then further including a power spring, the control spring being arranged with respect to the power spring such that the force exerted by the power spring is detracted from the force exerted by the power spring, the residual force exerted by the power spring being the output force.

The measuring means may be responsive to the degree of rotation of the electric motor and, in this case, may be a Hall-effect switch.

Alternatively, the measuring means may be responsive to the length of a spring of the spring system and may then comprise two parts of which one carries a series of switches by which operation of the electric motor can be controlled and the other a cam by which the switches can be sequentially operated. One of the parts may be fixed in relation to one end of the spring and the other is adjustable in a direction towards and away from the one of the parts in relation to the other end of the spring. When the actuator is a brake actuator of a vehicle, said other of the parts of the measuring means may be adjustable in said direction in accordance with the load of the vehicle.

As a further alternative, the measuring means may be responsive to the force exerted by a spring of the spring system.

Embodiments of the present invention will now be described in greater detail, by way of example only, with refernce to the accompanying drawings of which:

FIG. 4 shows a longitudinal cross-sectional view of a third embodiment,

FIG. 5 shows a scrap transverse cross-sectional view on the line x—x of FIG. 4,

Figure 6:
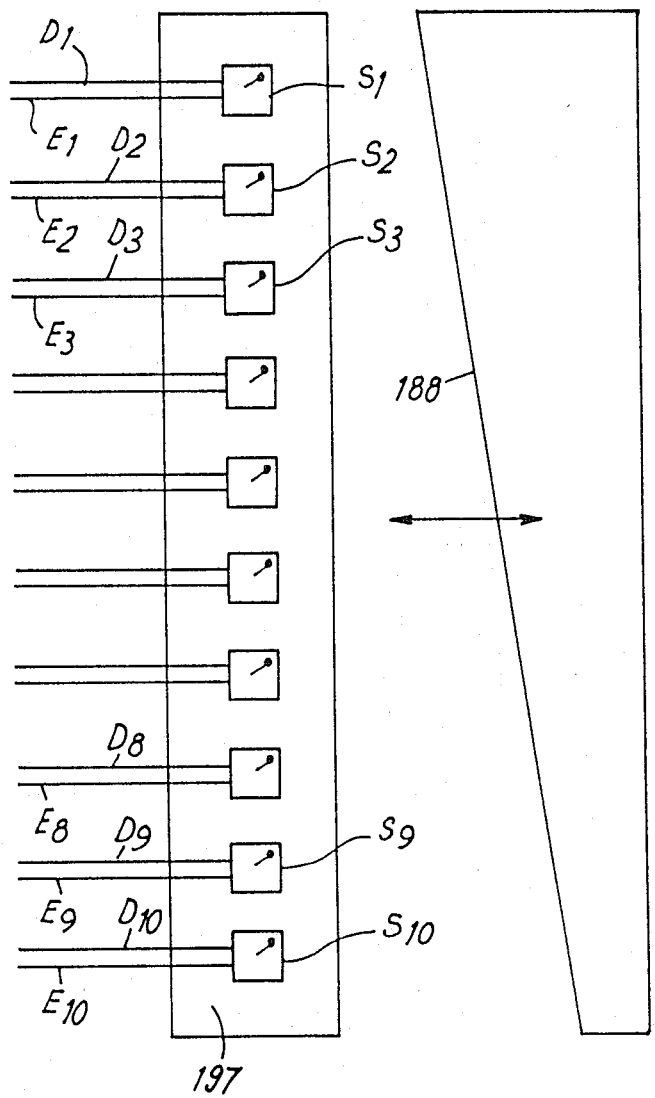
Figure 7:
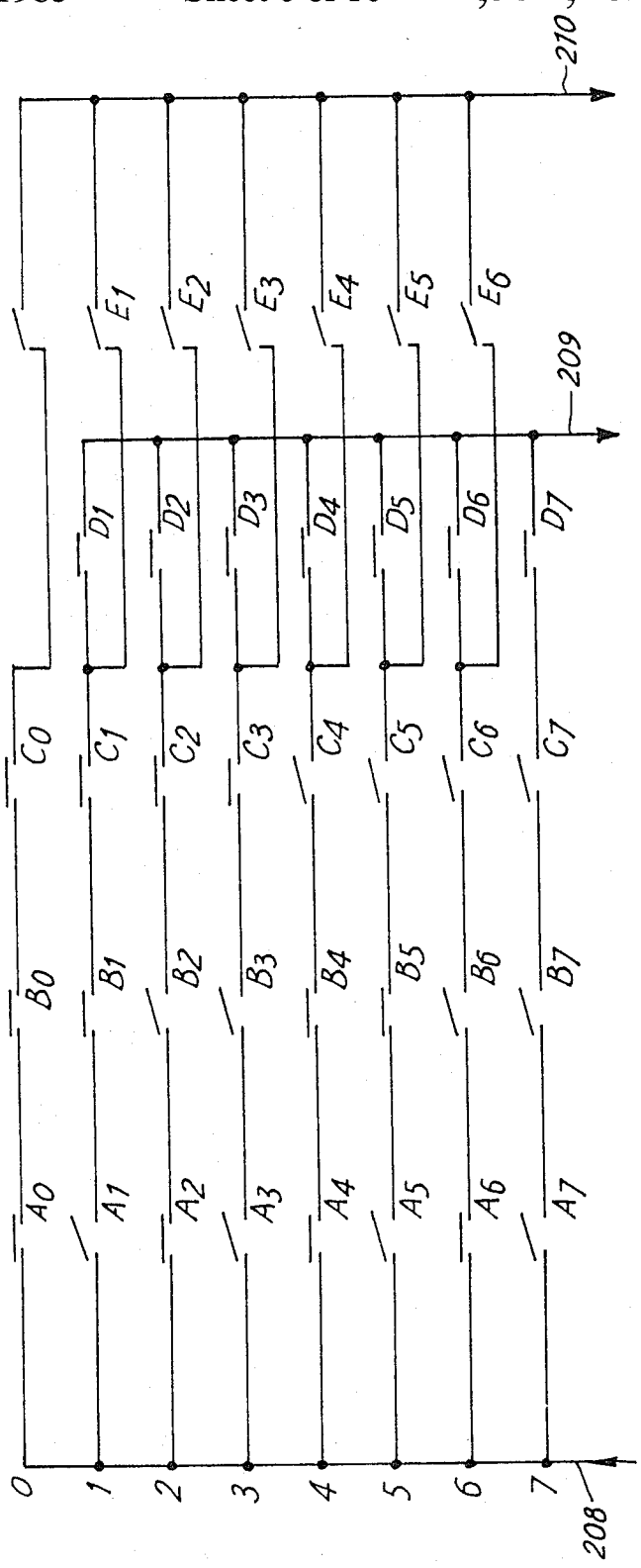
Figure 8:
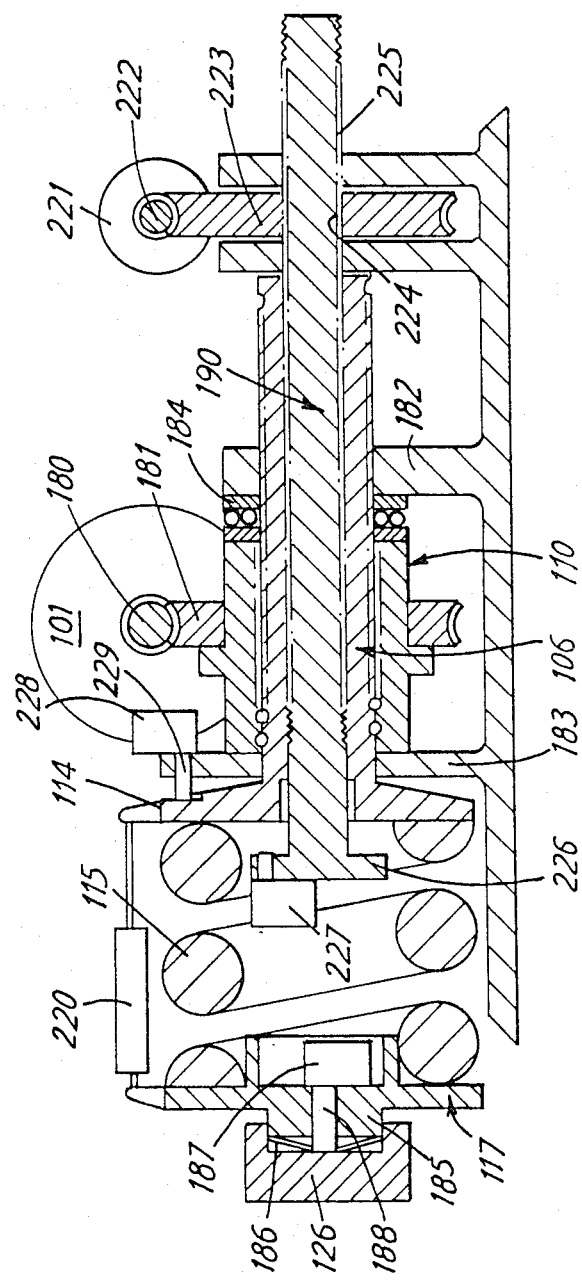
Figure 9:
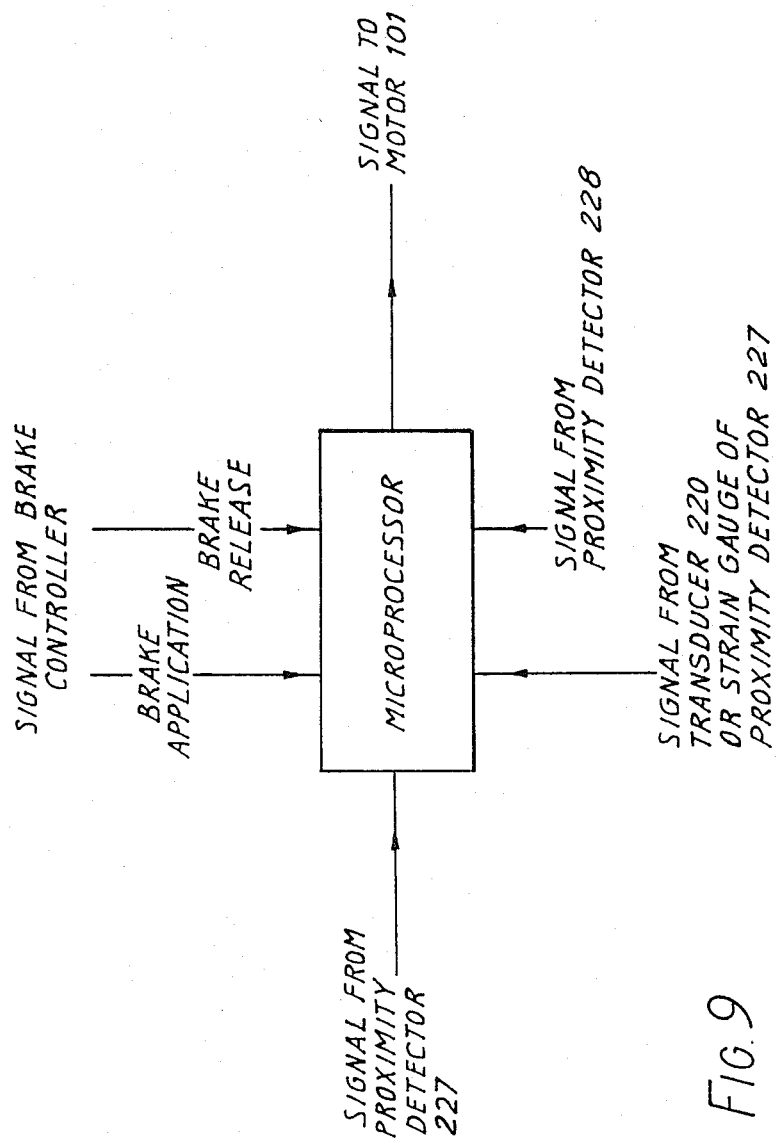
Figure 10:
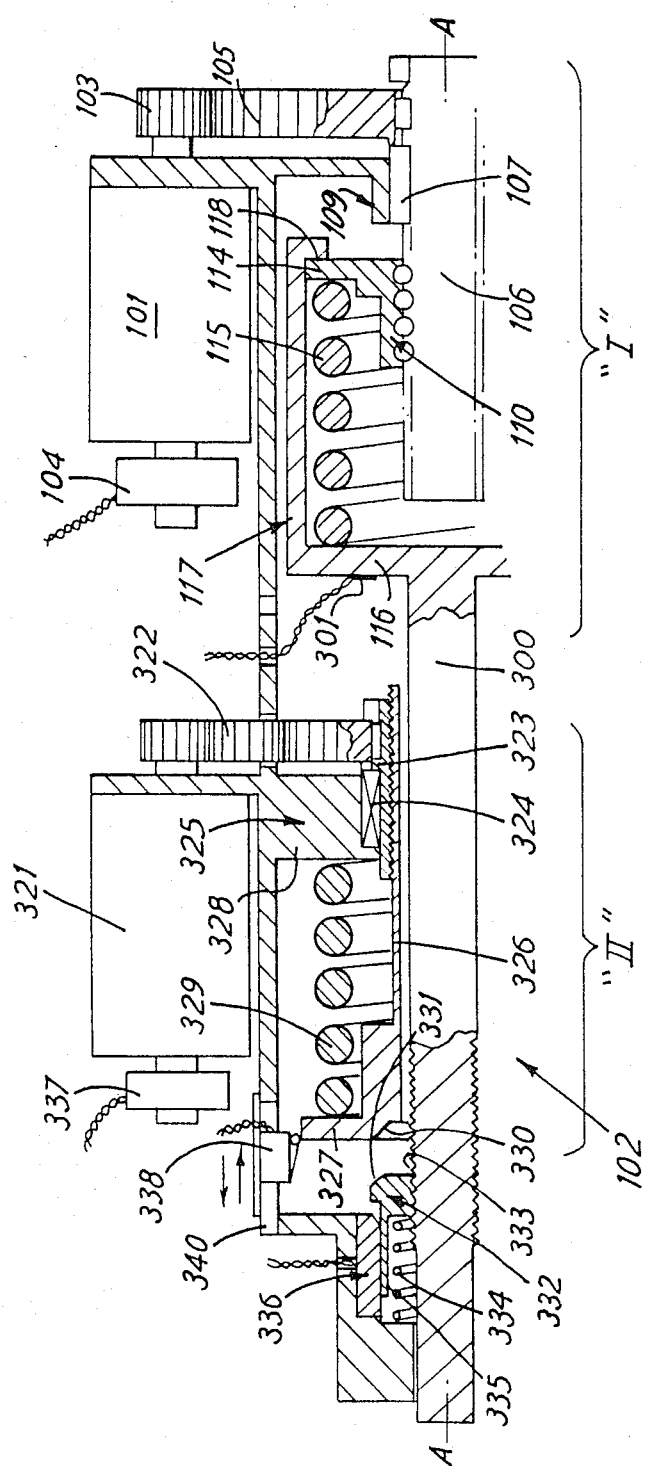
Figure 11:
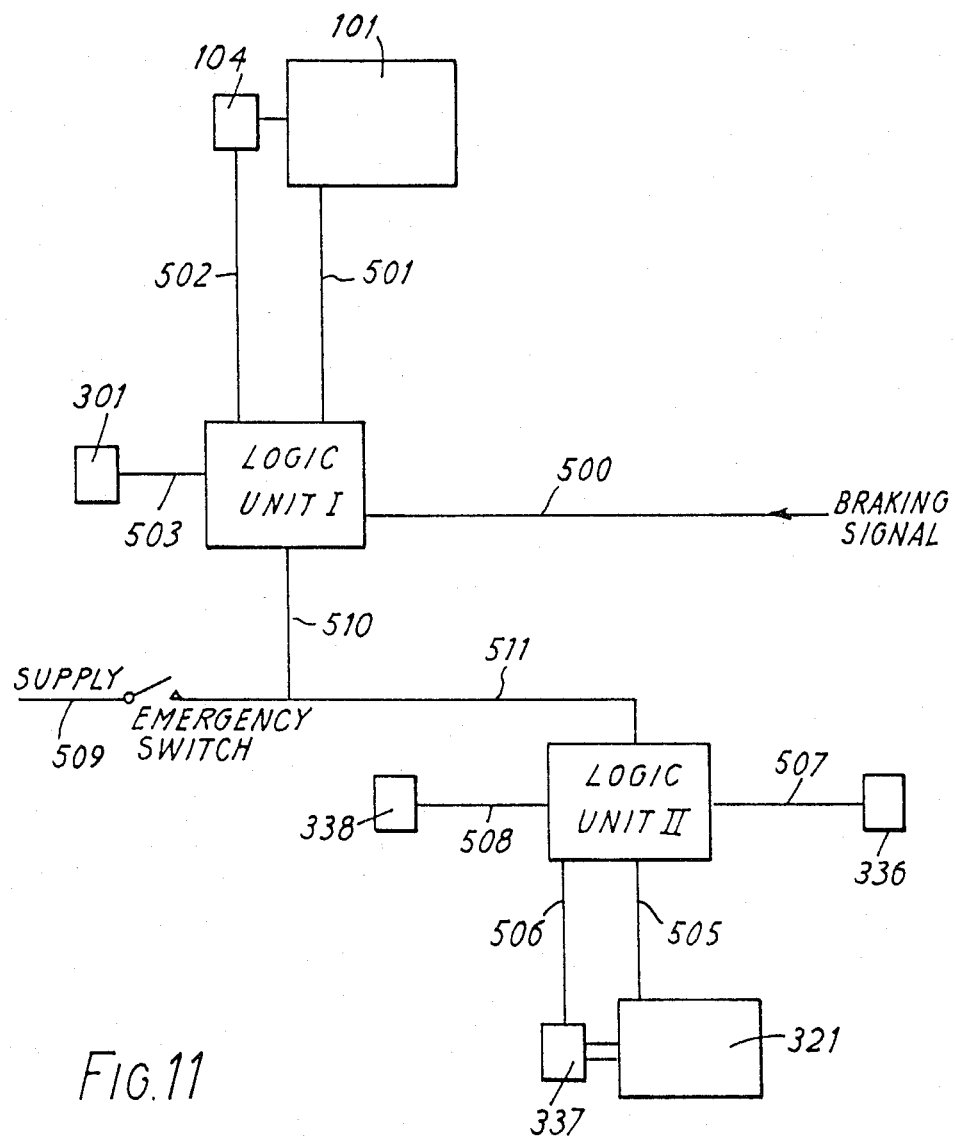

FIG. 6 diagrammatically shows the arrangement of the switches and the cam for use in FIG. 4, FIG. 7 shows part of the electrical circuit for operating the actuator of FIG. 4, FIG. 8 shows a longitudinal cross-sectional view of a fourth embodiment, FIG. 9 shows, diagrammatically, the electrical circuit for controlling the actuator of FIG. 8, FIG. 10 is a longitudinal cross-sectional view of a fifth embodiment, and FIG. 11 shows, diagrammatically, the electrical circuit for control of the embodiment of FIG. 10.

The following embodiments of the invention will all be described in the context of railway brake actuators.

It will, however, be understood that the concepts incorporated in the following described embodiment can equally well be used in brake actuators for other forms of vehicles. Indeed, they are applicable also to brake actuators for other forms of rotating machinery or, generally, to actuators for generating a force for other than braking usage.

Figure 1:
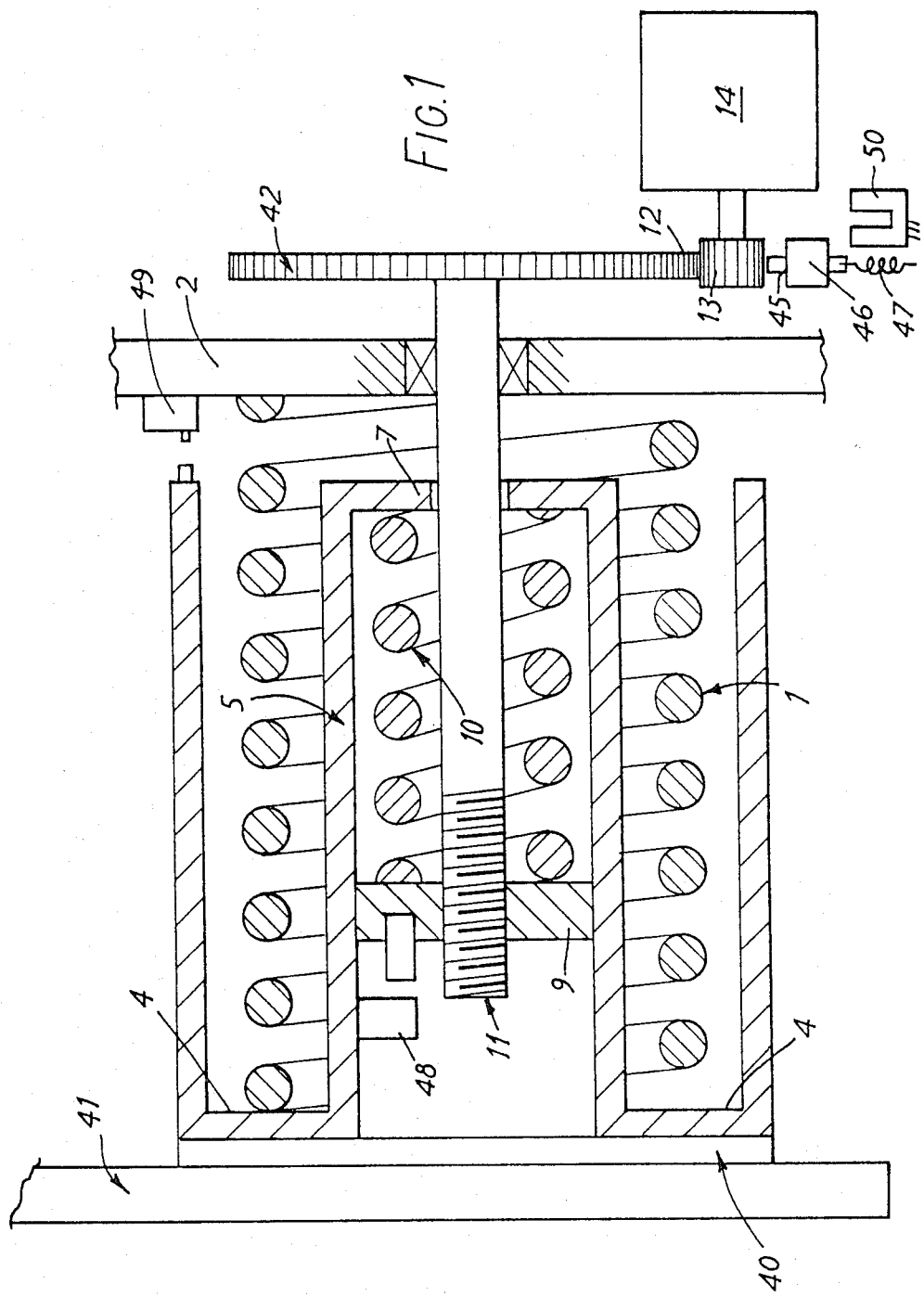
FIG. 1 is a diagrammatic cross-sectional view of a first embodiment.

Referring now to FIG. 1, the actuator includes the power spring 1 and the control spring 10. The power spring 1 is operative between the intermediate wall 2 of the housing (not shown in totality in FIG. 1) and the flange 4 of the output member 5. The control spring 10 is operative between the second flange 7 on the output member 5 and a nut 9 threadedly engaged with a reversible screw thread on a ball-screw shaft 11.

Carried by the flange 4 of the output member 5 is a brake pad 40 engageable with a brake disc 41.

At its end opposite from the nut 9, the ball-screw shaft 11 carries a slotted disc 42 the periphery of which provides the gearwheel 12 meshed with the pinion 13 arranged to be driven by the electric motor 14.

As thus far described, in the "brake released" condition shown in FIG. 1, the control spring 10 is held fully compressed and overcomes the force exerted by the power spring 1 thus holding the brake pad 40 out of engagement with the brake disc 41. Operation of the electric motor 14 will "let out" the control spring 10 and, thereby, reduce the force which it exerts in opposition to the power spring 1. By variably operating the electric motor 14 to vary the detractive force exerted by the control spring 10, the residual force exerted by the power spring 1 on the output member 5 can be varied to produce the required braking force exerted by the brake pad 40 on the brake disc 41.

To lock the electric motor 14 in any desired position of its operation, is a pawl 45 operable under the control of a solenoid 46 to engage between the teeth of the pinion 13. The pawl 45 is loaded by a spring 47 normally to be out of engagement with the pinion 13, energisation of the solenoid 46 driving the pawl 45 into between the teeth of the pinion 13 against that spring loading.

Located adjacent the slotted disc 42 is a slotted Hall-effect switch 50 which measures the degree of rotation of the disc 42.

Carried by the output member 5 is a first microswitch 48 which lies in the path of the nut 9. A second microswitch 49 carried by the intermediate wall 2 lies in the path of the output member 5 in its direction of travel to release the brakes.

This FIG. 1 embodiment operates in the following manner:

The actuator is shown in FIG. 1 in its "brakes released" condition and in this condition the solenoid 46 will have been energised to engage the pawl 45 with the pinion 13 and thus hold the motor 14 and slotted disc 42 in a position in which the control spring 10 is held compressed sufficiently fully to overcome the power spring 1. Thus the output member 5 will have been retracted and the brake pad 40 held out of engagement from the brake disc 41.

From this "brakes released" condition, an electrical control signal is first generated to indicate the required degree of braking. The generation of this control signal will first de-energise the solenoid 46 so that the spring 47 will withdraw the pawl 45 from engagement with the pinion 13. The release of pinion 13 then frees, through the gearwheel 12, the slotted disc 42 and the shaft 11 for rotation. Freeing the shaft 11 for such rotation, allows the control spring 10 to expand driving the nut 9 to the left. At the same time, expansion of the control spring 10 reduces the force which it exerts in opposition to the power spring 1 thus allowing the spring 1 to expand driving the output member 5 to the left to bring the brake pad 40 into engagement with the brake disc 41.

When the brake pad 40 is engaged with the brake disc 41, the output member 5 is prevented from any further leftward movement and the power spring 1 from any further extension. However, the control spring 10 is not so inhibited and it will continue to expand. Shortly after the brake pad 40 engages the brake disc 41, the continuing expansion of the control spring 10 will carry the nut 9 to engage the microswitch 48. Operation of the microswitch 48 generates a signal to cause the slotted Hall-effect switch 50 to start measuring the rotation of the disc 42. Clearly, the rotation of the disc 42 is a measure of the axial movement of the nut 9 which is, itself, a measure of the expansion of the control spring 10. In so far as the expansion of the control spring 10 is indicative of the reduction of the force which it exerts in opposition to the power spring 1 and, therefore, an indication of the residual force exerted on the output member 5 by the power spring 1 and, consequently, the braking force being exerted by the brake pad 40 on the brake disc 41, the rotation of the disc 42 is an indirect measurement of the braking force being exerted. The output signal from the slotted Hall-effect switch 50 is therefore compared with the original electrical signal generated to indicate the required degree of braking. When this output signal indicates a degree of braking just short of that indicated as required by the original electrical circuit, the solenoid 46 is energised to prevent any further extension of the control spring 1. The control spring 1 will thus be brought to a halt at a point which will result in the required degree of braking. Should the solenoid 46 have been energised too early or too late so that the nut 14 "undershoots" or "overshoots", this will be seen by the switch 50 and the solenoid 46 and the motor 14 operated accordingly. When the switch 50 "reads" the rotation of the disc 42 as indicative of the braking force being that required, the solenoid 46 is energised to engage the pawl 45 with the pinion 13 and thus "lock-in" that required degree of braking.

Should a variation in the required degree of braking now be indicated by variation of the original electrical signal, the pawl 45 will again be released and the electric motor 14 energised, if appropriate, to vary the degree of braking to bring it into accord with the variation to the electrical signal.

To release the brakes, the electrical signal is suitably revised. Such revision will, again, first cause the pawl 45 to be released from engagement with the pinion 13 and, thereafter, the motor 14 energised. Energisation of the motor 14 will now, through the pinion 13 and the gearwheel 12, rotate the shaft 11 to "wind-back" the nut 9 and re-compress the control spring 10. Initial re-compression of the spring 10 will increase the force detracted by it from that exerted by the power spring 1, thus reducing the braking force being exerted between the brake pad 40 and the brake disc 41. When this braking force has been substantially wholly reduced, continued compression of the control spring 10 will pull the brake pad 40 away from the brake disc 41. Just prior to the brake pad 40 leaving the brake disc 41, the nut 9 will also leave the microswitch 48. Thereafter, the motor 14 is continued to be operated for a predetermined amount (again, measured by the slotted Hall-effect switch 50) to provide the required clearance between the brake pad 40 and the brake disc 41.

It will be observed, of course, that any electrical power failure will result in a full brake application as loss of power will result in the pawl 45 being retracted from the pinion 13 by the spring 47 with the motor 14 remaining de-energised. Hence, the control spring 11 can fully expand to allow the totality of the force exertable by the power spring 1 to be applied as a braking force to the output member 5.

It will have been noted that, so far in the description of the operation, no mention has been made of microswitch 49. Spring-applied brake actuators conventionally have a manual release facility. It will be seen that the microswitch 49 is positioned beyond the normal "brake release" condition of the actuator. After a manual release, the control spring 10 will need to be compressed beyond its normal fully compressed condition so that the power spring 1 is, equally, more than fully compressed. The function of the microswitch 49 is to detect when the two springs 1 and 10 have been sufficiently over-compressed as to permit re-setting of the manual release.

Figure 2:
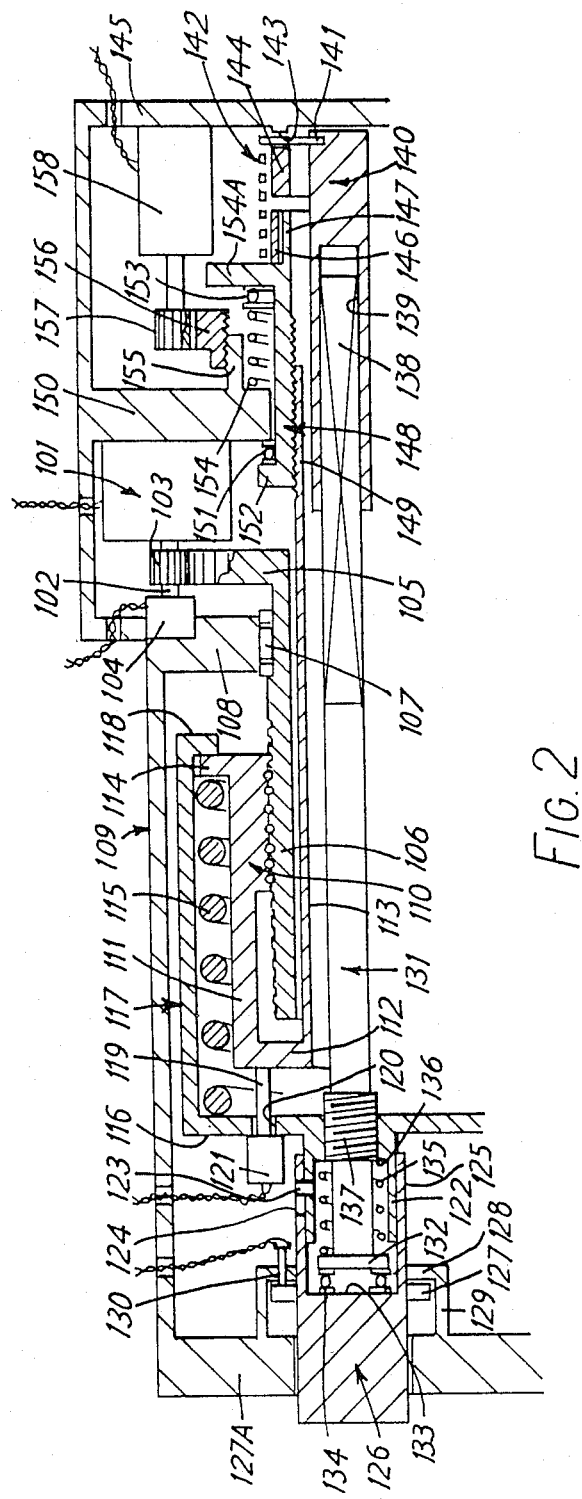
FIG. 2 is a longitudinal half-sectional view of a second embodiment.

Referring to FIG. 2, the actuator comprises an electric motor 101 of which the output shaft 102 passes through a pinion 103 secured on the shaft 102, to an electrically-operated clutch 104. The pinion 103 is meshed with a gearwheel 105 secured to one end of a ball-screw tube 106 which is mounted for rotation in bearing 107 in an intermediate wall 108 of the actuator housing 109.

Threadedly engaged with the ball-screw tube 106 is a nut 110 having a leftwardly-extending tubular extension 111 at the right-hand extremity of which is a radially-inwardly projecting flange 112. From the inner periphery of the flange 112 extends rightwardly a tube 113 lying co-axially with the ball-screw tube 106.

Projecting radially outwardly from the end of the nut 110 remote from the tubular extension 111, is a second flange 114. The flange 114 is abutted by one end of a spring 115 the other end of which abuts the end wall 116 of a spring housing 117 which constitutes the output member of the actuator. The housing 117 has, at its end remote from the end wall 116, an inwardly-projecting flange 118. As can be seen from FIG. 1, the spring 115 is trapped in the housing 117 by the flange 114 on the nut 110 being trapped between the spring 115 and the flange 118 of the spring housing 117. Extending from the flange 112 on the nut 110 is a shaft 119 which passes through a bore 120 in the end wall 116 of the spring housing 117, to a transducer 121 mounted on that end wall 116. The transducer 121 measures the force exerted by the spring 115 by measuring its degree of compression as will be hereinafter seen.

The end wall 116 of the spring housing 117 is provided with an axially-projecting tubular extension 122.

The tubular extension 122 carries a pin 123 which extends into a slot 124 in a tubular extension 125 of a final output member 126. Hence, the pin 123 and the slot 124 constitute a pin-and-slot connection 123/124 between the two tubular extensions 122 and 125 which permits relative axial movement between the two whilst preventing relative rotation between them.

Surrounding the final output member 126 is a friction ring 127. This ring frictionally engages the member 126 but, under sufficient force, can be slid either way axially of the final output member 126. The friction ring 127 is housed between the end wall 127 of the actuator housing 109 and a flange 128 on the end of a tubular projection 129 which projects inwardly of the actuator housing 109. Hence, the degree of movement of the friction ring 127 is limited to between the end wall 127 and the flange 128. Should the final output member 126 be moved a greater distance than this limited movement, then the friction ring 127 being thereby caused to engage the end wall 127 or the flange 128, as the case may be it will be caused frictionally to slide on the final output member 126. Mounted in the flange 128 is a pair of electrical contacts 130 located so as to be "made" by the friction ring 127 when it abuts the flange 128.

Projecting co-axially within the tubular extensions 122 and 125 is one end of a shaft 131. At its extremity of this end the shaft 131 has a flange 132 between which and the internal face 133 of the final output member 126, is a thrust bearing 134. Also, extending between this flange 132 on the opposite side from the bearing 134, is a spring 135 of which one end abuts the flange 132 and the other abuts an internal end face 136 of the end wall 116 of the spring housing 117. By this spring 135, the shaft 131 is urged to the left to engage its flange 132 with the thrust bearing 134.

The shaft 131 passes through the end wall 116 of the spring housing 117 and is there threadedly engaged with the end wall 116 by means of the threaded portion 137 of the shaft 131.

The shaft 131 passes co-axially through the tube 113 of the nut 110 and, at its end portion 138 remote from its flange 132, is square in cross-section. The end portion 138 of the shaft 131 is received in a similarly cross-sectioned bore 139 in a clutch-operating part 140. This part 140 receives the tail 141 of a square-section wire spring 142, which passes through a circumferential slot 143 in a tubular boss 144 extending inwardly of the actuator housing 109 from its end wall 145. The spring 142 is wrapped-around a cluch part 146 so that the spring 142 and part 146 constitutes a one-way rotational clutch 142/146 by which the clutch-operating part 140 is clutched for rotation with the clutch part 146 for rotation therewith in one direction but is free to rotate relative to the clutch part 146 in the opposite direction.

The clutch part 146 is in the form of an internally-splined sleeve, the splines of which are interdigitated with corresponding splines on a hub 147 of a second nut 148. Thus, the clutch part 146 can move axially with respect to the nut 148 but is non-rotationally engaged therewith.

The nut 148 is threadedly-engaged with a threaded end portion 149 of the tube 113. The nut 148 is supported for rotation in a second intermediate wall 150 of the actuator housing 109 by a first thrust bearing 151 located between a flange 152 on the nut 148 and one side of the intermediate wall 150 and by a second thrust bearing 153 located between a second flange 154 on the nut 148 and a spring 154 one end of which abuts the second bearing 153 and the other side of the intermediate wall 150 of the housing 109.

Surrounding the spring 154 is a threaded boss 155 projecting from the intermediate wall 150 and threadedly-engaged by an adjustable stop 156. The exterior wall of the stop 156 is toothed and engaged by a pinion 157 arranged to be driven by a second electric motor 158. It will be seen that operation of the electric motor 158 will adjust the stop 156 axially on the boss 155. The stop 156 is located to be in the path of and, therefore, to be abutted by, the flange 154 on the nut 148.

Figure 3:
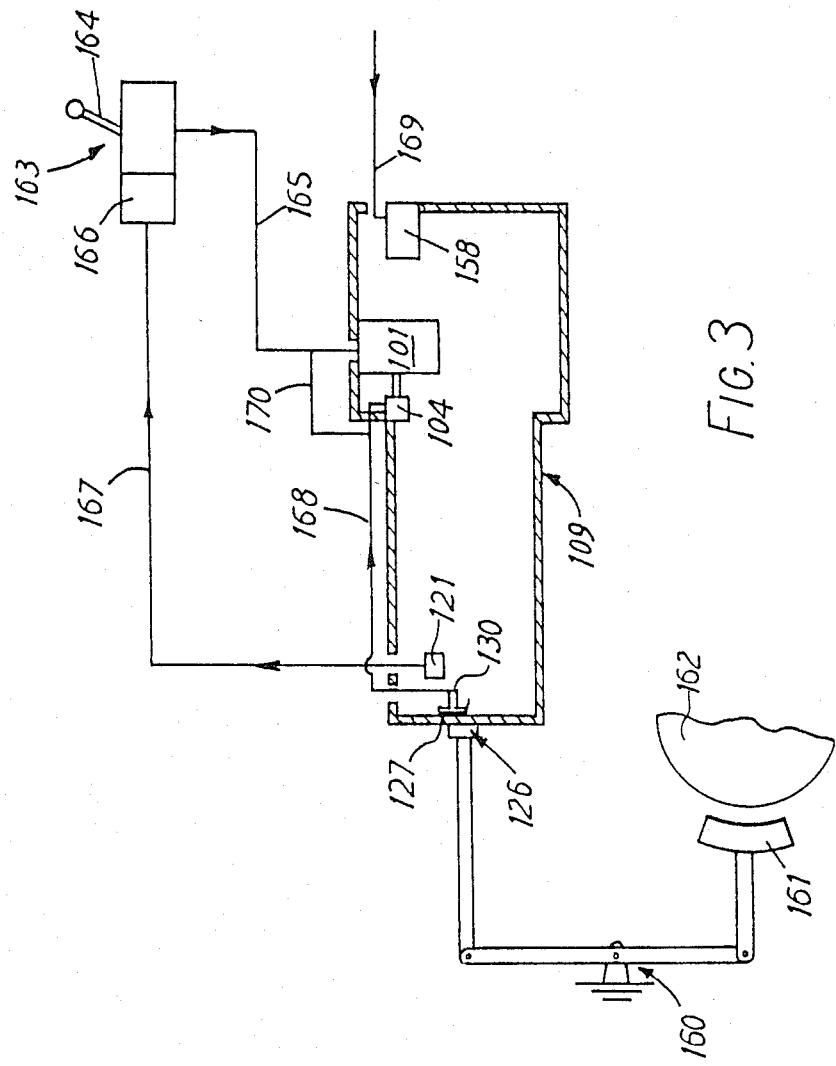
FIG. 3 shows the electrical circuit for the actuator of FIG. 1.

Referring now to FIG. 3 which shows the electrical circuit for controlling the actuator described above with reference to FIG. 2 being used as a railway brake actuator, the final output member 126 of the actuator is coupled, through a linkage mechanism 160 to a brake block 161 engageable with a railway vehicle wheel 162.

For controlling the brake block 161, there is a brake controller 163 operating the handle 164 of which generates over line 165 a signal indicative of the degree of braking required. This signal is fed to the electric motor 101. Fed back to a comparator 166 in the brake controller 163 over the line 167 from the transducer 121 is a signal indicative of the force being exerted by the spring 115 (FIG. 2).

The pair of contacts 130 are in the circuit 168 of the electrical clutch 104.

Applied over the line 169 to the second electric motor 158, is a signal indicative of the load of the railway vehicle.

The actuator shows in FIG. 2, controlled by its electrical circuit as shown in FIG. 3, operates as follows:

The actuator is shown in FIG. 2 in its "brakes released" condition.

In this condition, the motor 101 is de-energised and its clutch 104 energised by the "making" of the pair of contacts 130 being engaged by the friction ring 127.

The second motor 158 will have been energised over the line 169 to an extent indicative of the load of the railway vehicle. Such energisation of the motor 158 will have rotated the nut 156 on the threaded boss 155 axially to position it, again, in accordance with the load of the vehicle.

In this condition of the actuator, the brake block 161 will be clear of the wheel 162 by the required amount of normal clearance.

Brake Application

To effect a brake application, the handle 164 of the brake controller is operated to a degree to indicate the degree of braking required. Such operation will generate on line 165 an electrical signal which, firstly, over line 170 will de-energise the clutch 104 and, secondly, will energise the electric motor 101.

De-energisation of the clutch 104 frees the motor 101 for rotation upon its energisation and such consequential rotation will, through pinion 103, rotate the ball-screw tube 106. Rotation of tube 106 will feed the nut 110 to the left (as viewed in FIG. 2) carrying with it the spring housing (or output member) 117 as, there being little resistance to movement of the housing 117, the effort of the spring 115 will cause the housing 117 axially to move with the nut 110. The housing 117 will also carry with it the final output member 126 and the shaft 131 as these parts will be held together with the spring housing 117 by the spring 135. The movement of the final output member 126 will, through the linkage 160, move the brake block 161 into engagement with the wheel 162.

During this movement of the housing 117, the nut 148 will be caused to rotate on its bearings 151 and 153 (being retained in its axial position as shown in FIG. 2 by the spring 154) as the threaded portion 149 of the tube 113 is drawn through the nut 148.

After the brake block 161 has engaged the wheel 162, resistance to further movement by all those parts previously involved will now suddenly increase as this engagement resists further movement of the final output member 126. As this member 126 tends to stop, continued operation of the electric motor 101 under the influence of the signal being fed over line 165 will, continue the movement of the nut 110. The final output member 126 being temporarily arrested in its movement, the consequent continued movement of the spring housing 117 will collapse the spring 135; the housing 117 being permitted to continue its movement relative to the final output member 126 due to the pin-and-slot connection 123/124 between the tubular extensions 122 and 125 respectively of the housing 117 and the member 126.

As the spring 135 collapses, the shaft 131 being prevented from further axial movement by the arresting of the final output member 126, the shaft 131 will be forced to rotate as the threaded engagement of the housing 117 is forced along the threaded portion 137 of the shaft 131. Rotation of the shaft 131, through its square section portion 138 engaged in the bore 139 of the clutch operating part 140 (which, previously, merely moved axially relative to that part 140) will rotate the clutch operating part 140. Such rotation causes the clutch 141/142/146 to arrest the rotation of the nut 148.

The braking force now starting to be exerted by the brake block 161 on the wheel 163 will build up as the motor 101 is continued to be operated. The continued rotation of the motor 101 will continue to "screw" the nut 110 to the left now to compress the spring 115 causing it to exert a growing output force on the spring housing 117 and, through the spring 135, on the final output member 126. As the spring 135 further compresses under this growing output force, the nut 148 (now being prevented by the clutch 141/142/146 from rotation) will be carried axially to the left with the tube 113 being free to do by virtue of the splined connection of the clutch part 146 to the hub 147 of the nut 148. Such movement of the nut 148 carries its flange 154A towards the stop 156.

The transducer 121 will be registering this growing output force and will be feeding back to the comparator 166 of the brake controller 163, a signal indicative of the value of the force. When this feed-back signal from the transducer is recognised by the comparator as being indicative of the braking force required as indicated by the degree of operation of the handle 164 of the brake controller, the comparator will terminate the signal previously applied over the line 165. Such termination will, firstly, energise the clutch 104 to "lock-in" the braking force being exerted and, secondly, de-energise the motor 101 to prevent any further increase of the braking force.

Clearly, from this "brake applied" condition of the actuator, the braking force exerted can be increased or reduced, by suitable further operation of the handle 164 of the braking controller. Such further operation, for increasing the braking force, will de-energise the clutch 104 and re-energise the motor 101 until the new and higher braking force is exerted and, for reducing the braking force, will merely de-energise the clutch 104 and energise the motor 101 in the reverse direction to allow the spring 115 to re-expand until the braking force (as detected by the transducer 121) has reduced to the new lower value whereupon the clutch 104 will be re-energised.

It has been assumed in the above-described operation that the braking force called for by operation of the controller has not exceeded that suitable to the loading of the vehicle. Were it to have been otherwise, before the called-for degree of braking had been effected, the flange 154A on the second nut 148 would have engaged the stop 156. Such engagement would have arrested the nut 148 at the permitted maximum level of braking force and, through the tube 113, would have prevented any further movement of the nut 110 and, therefore, any further compression of the spring 115. Hence, the maximum output force permitted to be exerted by the spring 115 on the final output member 126 would have been limited.

Brake Release

From the "brake applied" condition of the actuator, the brake is released by appropriate operation of the handle 164 of the brake controller 163. Such operation will, firstly, again de-energise the clutch 104 and, secondly, this time energise the motor 101 for operation in the opposite direction to that in which it was operated to apply the brake. Such reverse operation of the electric motor 101 will "wind-back" the nut 110 to the right thus, initially, allowing the spring 115 to recover until it is again housed by the spring housing 117 when the previously-applied braking force will have been fully recovered. In the process of such recovery, the spring 135 will also have fully recovered rotating the shaft 131 in the direction opposite to its previous rotation and, thereby, restoring the flange 154 to the position which it initially had spaced from the stop 156.

When the braking force has been fully relieved, the rigging spring normally incorporated in the lever system 160 will assist the return of the brake block 161 to its normal clearance from the wheel 162. This will occur as the final output member 126 is withdrawn to its original position, through the pin-and-slot connection 123/124, as the housing 117 is moved back to the right under the influence of the now housed spring 115, by continued rightward movement of the nut 110 as the ball-screw tube 106 continues to be rotated by the motor 101. During this further movement, the shaft 131 will also be returned to the right. However, once the spring 135 has fully recovered upon the braking force been fully relieved, such movement of the shaft 131 is purely axial as there is now no relative movement between the spring housing 117 and the shaft 131. Such mere axial movement of the shaft 131 is accommodated by the square-section end portion 138 of the shaft 131 sliding in the bore 139 in the clutch-operating part 140. Hence, there is no further rotation of part 140 during this phase of the recovery and, therefore, no further axial movement of the second nut 148. The axial movement of the nut 110 relative to the second nut 148 is accommodated by the second nut 148 spinning on its bearings 151 and 153 as the tube 113 of the nut 110 is forced through the second nut 148.

All the above described "brake release" movements continue until the friction ring 127 is moved back by movement of the final output member 126, to "remake" the pair of contacts 130. Upon this occurring, the clutch 104 will be re-energised to "lock" the actuator in the "brakes released" condition and the motor 101 de-energised to cease its operation.

Slack Adjustment

In the above described operations, it was assumed, as stated, that the original clearance between the brake block 161 and the wheel 162 was that required.

Had this clearance, in fact, been in excess of the required, the following would have occurred:

During the "brake application", because the clearance was greater than that required, the friction ring 127 would have engaged the end wall 127A of the housing 109 before the brake was fully applied. This being so, once the ring 127 was arrested from further leftward movement by this engagement, the continued movement of the final output member 126 would have forced that member 126 through the ring 127 by an extent indicative of by how much the clearance was excessive. Hence, upon the "brake release" operation, as this operation is terminated by the "remaking" of the pair of contacts 130 by their engagement by the friction ring 127, at the end of the "brake release" operation, the clearance between the brake block 161 and the wheel 162 would be restored to that required.

It will be seen, therefore, that the gap between the friction ring 127 and the end wall 127A of the actuator housing 109 is a measure of the required total stroke of the actuator.

Referring now to FIGS. 4 and 5, in which like references are used for like parts of the embodiment of FIG. 2, the actuator comprises an electric motor 101 which, through a worm 180, is arranged to rotate a worm-wheel 181. The worm-wheel 181 is secured to a nut 110 which is threadedly-engaged with a ball-screw tube 106 which is rotatably-supported in a pair of walls 182 and 183 upstanding from a base plate 184. Between the wall 182 and the nut 110 is a thrust bearing 196.

The ball-screw tube 106 has, at its left-hand end, a flange 114 between which and a cup-shaped output member 117 extends a spring 115.

As so far described, it will be appreciated that if the motor 101 is energised in one direction, the nut 110 will be rotated relative to the ball-screw tube 106 axially to move that tube 106 to the left. Rotation of the motor 101 in the opposite direction will, equally, axially move the tube 106 to the right. Leftward movement of the tube 106 will, through the spring 115, move the output member 117 to the left. Should the output member 117, at any point, be prevented from such leftward movement, then the spring 115 will be compressed by continued operation of the motor 101 and thus caused to generate a growing output force on the output member 117 with the continued operation of the motor 101. From such a condition in which the motor 101 has compressed the spring 115 to cause it to generate the output force, reverse operation of the motor 101 will, firstly, reduce the output force being generated and, thereafter, allow the output member 117 to be moved back to the right with the spring 115.

Carried on a boss 185 of the output member 117 is a final output member 126 between which and the end face of the boss 185, is a belleville washer 186. Mounted on the interior of the output member 117 is a transducer 187 the detecting rod 188 of which projects through the base 185 and the belleville washer 186. The transducer 187 is thus arranged to detect compression of the belleville washer 186.

If the actuator is, therefore, arranged so as to exert a force on some part (not shown) which is normally axially spaced from the final output member 126, it will be seen that, as the final output member 126 is moved to the left by suitable operation of the motor 101 to effect the movements above described, the combination of the belleville washer 186 and the transducer 187 will allow detection of when the final output member 126 engages the part concerned. Conversely, in the reverse movement, the combination of the belleville washer 186 and the transducer 187 will allow detection of when the final output member 126 is about to leave the part concerned.

The output member 117 has co-axially mounted on its face opposite to the boss 185, a switch carrier 197. This carrier 197 has arranged around its circumference a series of switches shown diagrammatically at 187 in FIG. 4 and, still diagrammatically, in a developed projection of the circumference of the carrier 197, in FIG. 6. The switches S1-S10 (FIG. 6) are equally spaced around the circumferential face of the carrier 197 and are arranged to be sequentially operated by a cam face 188 again shown in a developed projection in FIG. 6. The switches S1-S10 are each double switches of which one "makes/breaks" the lines D1-D10 and the other "makes/breaks" the lines E1-E10. The arrangement of the double switches of each of the switches S1-S10 is such that, for left-to-right movement of the cam 188, the E switch is "made" after the D switch is "broken" and, for right-to-left movement of the cam 188, the E switch is "broken" before the D switch is "made". Hence, in each direction of movement of the cam 188, there is a "dead" fraction of time during which both D and the E switch of each switch S1-S10 are "broken".

Returning now to FIG. 4, the cam surface 188, constitutes the end face of a cup-shaped cam 189 which is co-axially and non-rotationally secured by its "bottom" to one end of a shaft 190 threadedly engaged co-axially with the ball-screw tube 106. Adjacent its end remote from the cam 189, the shaft 190 has secured to it a pinion 191 which, as shown in FIG. 4, is meshed with an arcuate gear 192. The gear 192 is pivotted about an axis 193 and is oscillatable about the axis 193 by a rod 194 pivoted to the gear 192 at 195. Axial movement of the rod 194, therefore, rotates the gear 192 about its axis 193 and, thereby, rotates the pinion 191. Rotation of the pinion 191 similarly rotates the shaft 190 and, by virtue of its threaded engagement with the ball-screw tube 106, moves the cam 189 towards or away from (depending on the direction of movement of the rod 194) the switches S1-S10. The rod 194 is moved in accordance with the load of the vehicle and it will thus be seen that the switches S1-S10 are operated earlier or later equally in accordance with the load of the vehicle.

The electrical circuit for controlling the actuator above described is shown in FIG. 7 from which it can be seen that there is provided a brake controller 200 operated by handle 201. The controller 200 has (not shown) an internal switching arrangement by which, in dependence upon the position of the handle 201, three control wires 202, 203 and 204 can be energised in a selected combination. Energisation of the control wires 202–204, operates the solenoids of the corresponding relay B205–207 to operate their associated contacts C0–C7, B0–B7 and A0–A7. The relay contacts are fed from a supply over line 208. The relay contacts are in series with the switches D and E of the switches S1–S10, the switches D and E of each switch S1–S10 being in parallel one with the other. The output of all of the D switches are commoned to an output line 209 and the E switches to an output line 210. Energisation of the line 209 energises the motor 101 of the actuator to drive the ball-screw tube 106 to the left as viewed in FIG. 3 and energisation of the line 210 energises the motor 101 to drive the ball-screw tube 106 to the right.

The above described actuator operates in the following manner:

The actuator is for the operation of a railway vehicle brake and is shown in FIG. 4 in the "brakes released" condition. The final output member 126 would in context, be coupled to the brake blocks for operating them into engagement with and to exert braking force on, the vehicle wheel in a manner similar to that shown in FIG. 3.

Brake Application

To effect a brake application, the handle 201 of the brake controller is moved to a position corresponding to the degree of braking required.

Movement of the handle 201 away from its "brake released" position immediately energises the motor 101 of the actuator in a direction, through worm 180, wormwheel 181, and nut 110, to move the ball-screw tube 106 to the left as viewed in FIG. 4. Through spring 115, output member 117, belleville washer 186 and final output member 126, such movement will move the brake block into engagement with the vehicle wheel. Such engagement of the brake will arrest the movement of the final output member 126 and continued operation of the motor 101 will cause the belleville washer 186 to collapse. This collapse will be detected by the transducer 187 which will thereby be operated to direct the energisation of the motor 101 via the line 208 and the contacts of the relays 205–207.

By moving the handle 201 of the brake controller 200 to effect the required degree of braking, the relays 205–207 will have been selectively energised to operate the various contacts A, B and C. For simplicity of description, let it be assumed that the degree of braking required has been indicated by movement of the handle 201 to a position in which only relay 205 has been energised. This energisation will reverse the position of all of its contacts C0–C7. It will, therefore, be seen that the line 100 which was previously the only wholly "made" line (indicative of "brake release") will now be "broken" and the only wholly "made" line will become line 104 leading to the switches D4 and E4 of the switch S4. E4 is, however, already "broken" so that the only completed circuit is via switch D4 which is in the line for energisation of the motor 101 to apply the brake. Hence, the motor 101 continues to be operated compressing the spring 115 and causing it to exert an output force on the output member 117. This force will be transmitted through the collapsed belleville washer 180 to the final output member 126 to be transmitted to the brake block as a braking force against the wheel.

As the ball-screw tube 106 continues its movement to the left as it collapses the spring 115, it will carry with it the cam 189. The cam face 188 will sequentially operate the switches S1, S2 and S3 but without any effect on the energisation of the motor 101 for the motor is only being energised over the line 104. However, when the ball-screw tube 106 has sufficiently compressed the spring 115 to cause it to generate the degree of braking required, the cam face 188 will operate the switch S4. In particular, it will operate the switch D4 of this switch S4, which was previously "made", to "break" it. By the "breaking" of switch D4, the line 104 over which the motor 101 was previously energised, will now be "broken" so that energisation of the motor 101 is now terminated. There being the "dead" space between the D and E switches of each switch S1–10, the "breaking" of switch D4 terminating the operation of the motor 101 results in cessation of travel of the cam face 188 before E4 is "made". Because of the worm-and-worm-wheel drive 180/181 between the motor 101 and the nut 110, this drive will "lock" to hold in the required degree of braking.

It will be remembered that the cam 189 was initially positioned by the mechanism 190–195 in accordance with the load of the vehicle. Hence, the degree of braking effected by operation of the motor 101 will be achieved irrespective of the load of the vehicle, the braking force generated by the spring 115 being adjusted to account for that load.

If, now, a different degree of braking is required, this is achieved by moving the handle 201 of the brake controller 200, to a new position. Such movement will change the status of energisation of the relays 205–207 and, through this changed status, complete a different line through the relay contacts. As the cam face 188 has previously moved over the switches S1–S4, the switches D1–D4 will successively have been "broken" and the switches E1–E4 successively "made" whilst the switches D5–D7 will continue to be "made" and the switches E5–E7 continue to be "broken".

Hence, if an increase in the degree of braking is now required, the re-positioning of handle 201 will, say, have also energised relay 206. This will cause the only wholly "made" line to be line 6. Thus, the motor 101 will be re-energised in the same direction as before to increase the braking effort until the cam face 188 has been moved to operate switch S6 and, thereby, operate its switch D6 to "break" the line 6 through which the motor 101 is now being energised.

Conversely, if a reduction in the degree of braking was required, the re-positioning of the handle 201 would, say, have additionally energised relay 207. The result of this would have been that only line 1 was now wholly "made".

It will be remembered that, in reaching switch S6, the cam 188 had previously operated switch S1 to "break" its switch D1 and make its switch E1. Hence the motor 101 will now be energised only over line 110. Such energisation will cause the motor 101 to be operation in its reverse direction to move the ball-screw tube 106 to the right (as viewed in FIG. 4). This movement will reduce the degree of compression of the spring 115 and, therefore, the degree of braking force which it causes to be exerted.

Brake Release

To release the brake, the handle 201 of the brake controller 200, is moved back to its "brake released" position. This will de-energise all of the relays 205–207 so that the only wholly "made" line is line 0. As the cam 188 has previously "broken" switch D1 and "made" switch E1, the motor 101 is now energised over line 110 to operate it in a direction to move the ball-screw tube 106 to the right thus progressively permitting the spring 115 to recover.

When the spring 115 has fully recovered so that it is no longer exerting any output force on the output member 117, the belleville washer 186 will recover. The final output member 126, the output member 117 and the spring 115 will now all be returned to their initial position by the normal return spring in the brake rigging of the brake block.

Slack Adjustment

As observed above, as the brake block is about to leave the wheel, by the braking force having reduced to zero, the belleville washer 186 will recover. This will be "seen" by the transducer 187.

To ensure the normal required clearance between the brake block and the wheel, the electrical circuit controlling the motor 101 may be such that re-operation of the transducer 187 causes continued operation of the motor 101 to a pre-determined extent after operation of the transducer 187 so that, under the influence of the conventional rigging return spring, the brake block is allowed to move away from the wheel a pre-determined distance before the motor 101 ceases operation and the system is "locked" by the worm-and-worm-wheel connection 180/181.

Alternatively, the motor 101 may have a fly-wheel to which it is connected in a "brake release" operation, the motor 101 then being de-energised as soon as the transducer 187 "sees" the recovery of the belleville washer 186 and the fly-wheel continuing rotation of the nut 110 to a pre-determined degree even after de-energisation of the motor 101.

Referring now to FIG. 8, the embodiment here shown is generally of similar construction to that of FIG. 4 and, again, like references are used for like parts. The similarity of these two embodiments is such that no further description is here needed of the like parts.

In this embodiment, the motor 101 may conveniently be a stepper motor operable to rotate the nut 110 in discrete steps thus effecting compression of the spring 115 equally in steps so that it is caused to generate on the output member 117 an output force which also increases in steps.

To measure the value of the output force being generated, there is arranged in parallel with the spring 115 a transducer 220 which generates a signal indicative of the degree of compression of the spring 115. In an alternative, the transducer 187 may not merely be responsive only to the compression and recovery of the belleville washer 186 for the purpose described above with reference to the embodiment of FIG. 4, it may additionally incorporate a strain gauge by which the strain experienced by the final output member 126 in the transmission of the output force is measured. With such arrangements, either of the transducers 220 or 187 will give signals indicative of the value of the output force being generated on the output member 117 by the spring 115.

In this embodiment, the axial position of the nut 110 is adjusted in accordance with the load of the vehicle by a second stepper motor 221 which, through a worm 222, is arranged to drive a worm-wheel 223. The worm-wheel 223 is threaded in its axial bore 224 and is thereby, threadedly-engaged with a screw-threaded portion 225 on the shaft 190.

At its end remote from the portion 225, the shaft 190 is provided with a flange 226 which carries a proximity-detector 227.

Unlike the embodiment of FIG. 4, the above-described arrangement does not permit of variable-load control of the braking force exerted throughout its range, but merely serves as a load-limiting arrangement to ensure that the braking does not exceed that which is acceptable for the load of the vehicle. To achieve this load-limited braking characteristic, the second stepper motor 221 is, prior to a brake application, operated to an extent consistent with the load of the vehicle. This will axially position the flange 226 (and, therefore, the proximity-detector 227) to a position indicative of the load of the vehicle. If, now, a brake application is made by the energisation of the motor 101, the ball-screw tube 106 will axially be moved to the left to compress the spring 115 and thus cause it to exert a braking force in the manner above described with reference to FIG. 4. Should a braking force be demanded which is higher than that permissible with the particular load of the vehicle, before that demanded degree of braking is achieved, the flange 114 of the ball-screw tube 106 will engage the stem of the proximity detector 227 so actuating it and immediately terminating any further increase in the braking force by de-energising the motor 101 and terminating further compression of the spring 115.

A further proximity detector 228 is provided which, by engagement of its stem 229 by the rear face of the flange 114 on the ball-screw tube 106, can detect when the ball-screw tube 106 is fully retracted. This detector 228 may be employed when it is required fully to retract the brake block to replace it, the motor 101 then being energised to operate it in the "brake released" direction beyond any normal clearance of the brake block with the wheel until the detector 228 is operated.

The above described actuator is controlled by electrical circuitry incorporating a microprocessor as illustrated in FIG. 9. From a suitable brake controller (such as that shown in FIG. 7), the microprocessor can be fed with either a "brake application" signal or a "brake release" signal, the "brake application" signal being suitably modified to indicate the degree of braking required to be exerted. A signal from the transducer 220 or the strain gauge of the proximity detector 227, is also fed to the microprocessor which constantly monitors this signal and compares it to the "brake application" signal. Upon receiving a "brake application" signal, the microprocessor generates a signal to the motor 101 causing it to be energised in a direction to apply the brakes. As the braking force generated by the spring 115 on the output member 117 increases by continued operation of the motor 101 compressing the spring 115, the signal from the transducer 220 or the detector 227 will continuously vary accordingly. When this varying feed-back signal is found by the microprocessor to equate with the degree of braking demanded by the "brake application" signal, the output signal to the motor 101 will be terminated. Hence, operation of the motor 101 ceases, and the desired degree of braking is "locked-in" by the worm-and-worm-wheel drive 180/181. Should, prior to such equation, the proximity switch 227 be operated (indicating that the demanded degree of braking exceeded that permissible for the load of the vehicle), the microprocessor will immediately terminate further operation of the motor 101.

In a "brake release" operation, the brake controller will feed a "brake release" signal to the microprocessor.

This will cause an output signal to the motor 101 to operate it in the reverse direction to move the ball-screw tube 106 to the right (as viewed in FIG. 8). Such movement of the tube 106 will allow the spring 115 to recover thus reducing, eventually to zero, the braking force previously exerted on the output member 117 by the spring 115. When the braking force is, in fact, reduced to zero, this is indicative that the brake block is about to leave the wheel. At this point, the belleville washer 186 will recover and the proximity detector 187 will be operated so to indicate. The microprocessor will then receive a signal from the detector 117.

Upon receipt of the signal, the microprocessor will allow continued operation of the motor 101 to a pre-determined extent; that extent being pre-determined to give a normal clearance between the brake block and the wheel.

Instead of the microprocessor being programmed for this "over-run" of the motor 101 to effect the normal clearance, the flywheel arrangement described above with reference to the FIG. 4 embodiment may be used.

Referring now to FIG. 10, it is in some contexts (and, particularly, some railway braking systems) to have a separate "stand-by" spring-applied brake actuator for use for "emergency applications." In the embodiment of FIG. 10, such a spring-applied brake actuator is shown in combination with an actuator constructed in accordance with the present invention. As can be seen, the two actuators are arranged in tandem, the actuators "I" being the normal "service application" actuator constructed in accordance with the present invention and actuator "II" being the spring-applied "emergency application" actuator.

For the actuator "I", like references are used for like parts in the embodiments previously described. This actuator comprises an electric motor 101 which, through pinion 103 and gearwheel 105, drives a ball-screw shaft 106 mounted in a bearing 107 in the actuator housing 109.

This spring housing 117 has an axially-extending shaft 300 the free end of which is connected to the brake operated by the system. Hence, the shaft 300 will be moved with the housing 117 to bring the brake into engagement with the railway-vehicle wheel (both not shown).

As the motor 101 is continued to be operated, the shaft 300 and the spring housing 117 now being prevented from further movement by engagement of the brake with the wheel, the nut 110 will start to compress the spring 115 and exert an increasing braking force.

To determine that the braking force exerted is that which is required, the end wall 116 is fitted with a strain gauge 301. By this gauge 301 the force exerted through the spring 115 can be measured by measuring the strain being exerted by the spring 115 on the end wall 116. When the braking force being exerted is detected as being that required, the electrical circuit of the system energises the electric clutch 104 to lock the actuator "I" and to switch off the motor 101.

The electrically-controlled spring-applied brake actuator "II" also has an electric motor 321 which, through gearing 322, is arranged to rotate an internally-threaded tube 323 mounted in a bearing 324 in a housing 325 on which is carried the motor 321. As will be seen from FIG. 9, the housing 325 is a onepiece construction with the housing of the actuator "I".

The tube 323 is threadedly engaged with an externally threaded tubular member 326 having at its end remote from its thread, a radial flange 327. Housed between this radial flange 327 and a radially inwardly projecting end wall 328 of the housing 325, is a brake-force applying spring 329.

The flange 327 has, towards its centre, a conical face 330. A complementary conical face 331 is provided on a nut 332 which is threadedly engaged with a reversible thread on a threaded portion 333 of the shaft 300 of brake-force applying member 117 which, it will be seen, is common to both actuators "I" and "II". The flange 327 and the nut 332 thus constitute clutch members of which the respective faces 330 and 331 constitute clutch faces interengageable by movement of the nut 332 to the right (as viewed in FIG. 10).

The nut 332 can be moved to the right by a spring 334 which is tending to spin the nut 332 along the threaded portion 333 of the output member 117. To control the nut 332, it has a leftward (as viewed in FIG. 10) tubular extension 335 which constitutes the armature of a solenoid 336.

Like actuator "I", the actuator "II" also has an electric clutch 337 by which the shaft of the motor 321 can be locked to hold the tubular member 326 in any desired position.

The actuator "II" above described operates in the following manner:

In the brake released condition as shown in FIG. 10, the motor 321 has previously been operated to drive (through gearing 322 and tube 323) the tubular member 326 to the right as viewed in FIG. 10. This will have compressed the brake-force applying spring 329 which will have been and will continue to be held in that condition by energisation of the electric clutch 337, which locks the tubular member 326 in the position shown in FIG. 10. After such locking, the motor 321 will have been de-energised.

Solenoid 336 will then have been energised to hold the nut 332 in its position shown in FIG. 10.

If, from this condition, a brake application is required, the solenoid 336 is first de-energised. This frees the spring 334 to spin the nut 332 up the threaded portion 333 of the shaft 300 of the output member 117 until its clutch face 331 engages the clutch face 330 in the tubular member 326. Shortly after the de-energisation of the solenoid 336, the electric clutch 337 is also de-energised. This, in unlocking the tubular member 326, allows the brake-force applying spring 329 to extend and, through the engaged clutch faces 330 and 331, to move the shaft 300 of the output member 117 to the left (as viewed in FIG. 10) to engage the brake with the vehicle wheel (both not shown). After such engagement, the spring 329 exerts a braking force on the brake.

The potential problem of the compounding of a "service brake application" effected with the actuator "I" with an "emergency brake application" effected with the actuator "II", is avoided with the above described equipment by an electrical circuit which ensures that the motor 101 and electric clutch 104 of actuator "I" cannot be energised whilst the solenoids 336 and electric clutch 337 of actuator "II" are de-energised.

The actuator "II" further includes a micro-switch 338. This micro-switch is for the purpose of limiting the maximum applied braking force exerted by the spring 329 by limiting the compression of that spring.

In railway vehicles particularly where the loaded-to-tare weight ratio is high, if the maximum brake-applying force exertable by the spring 329 were sufficient to effect an emergency stop of a fully-loaded vehicle, a dangerous situation might arise were the same force to be allowed to be exerted when the vehicle was empty or less than fully loaded.

The micro-switch 338 measures the extension of the spring 329 and, therefore, the force exerted by the spring 329 on the shaft 300 of the output member 117 when it is clutched thereto and the spring 329 is freed for extension from the position of the micro-switch 338. The micro-switch 338 is adjustable in position in the direction (left/right as viewed in the drawing) of extension of the spring 329.

The micro-switch 338 is positioned such as to be engaged by the flange 327 of the nut 330. The switch 338 is movable along the length of a slot 340 provided in the housing 325, the slot 340 extending in the same direction as that of the extension of the spring 329.

From a fully-extended condition of the spring 329, as the motor 321 is operated to compress the spring 329, when the flange 327 reaches the micro-switch 338, this switch will be operated, firstly to discontinue operation of the motor 321 and, secondly, to operate the clutch 337 to "lock" the nut 330 in the position in which its flange operated the micro-switch 338.

If, therefore, the micro-switch 338 has been positioned along the slot 340 in dependence upon the load of the vehicle, the spring 329 will now have been pre-set to exert a force which is equally dependent upon the load of the vehicle. Thus, when the actuator "II" is operated as above described, the force exerted by the spring 329 on the shaft 300 and, therefore, the braking force exerted thereby, will also be dependent on the loading of the vehicle.

To simplify the setting arrangement for reductions in load, the motor 321 can be arranged to let the spring 329 out to a "tare" position when the vehicle is stationary and then compress the spring 329 up to a required "load" position.

A suitable electric circuit to effect such control is shown in FIG. 11.

A circuit indicative of the required degree of braking is fed to Logic Unit I over line 500. Through the Logic Unit I, over line 501 the energisation of the motor 101 is controlled as is also, over line 502, the electric clutch 104. The Logic Unit I is also fed, over the respective lines 503 and 504 by the strain gauge 301 with feed-back signals indicative of the degree of force being exerted by the actuator "I". Hence, for a normal "service" brake operation, the Logic Unit I ensures the necessary degree of operation of the motor 101 and the control of the electric clutch 104 to secure the degree of brake application or release called for by the input signal applied over line 500.

Another Logic Unit II similarly controls the motor 321 and its electric clutch 337 over lines 505 and 506 respectively. Over line 507, the Logic Unit II controls the solenoid 336 and receives an input signal over line 508 from the micro-switch 338. A supply line 509 incorporates an Emergency Switch, the line feeding to both Logic Unit I over line 510 and the Logic Unit II over line 511. Opening of the Emergency Switch operates Logic Unit I to ensure that both the electric motor 1 of the actuator "I" and its clutch 104 cannot be energised by an input signal over line 500 or, if already energised, are de-energised. Over line 511, opening of the Emergency Switch gives an input signal to the Logic Unit II to de-energise the solenoid 336 and the clutch 337 and hold de-energised the motor 321. The maximum degree of braking permitted to be exerted by the actuator "II" is determined by the Logic Unit II upon operation of the micro-switch 338 feeding the Logic Unit II with an input signal over line 508.

We claim:

1. An electric actuator comprising an electric motor for controlling the output force generated by a spring system of the actuator on an output member of the actuator; measuring means responsive to the length of a spring of the spring system and comprising two parts, one of said parts carrying a series of switches for controlling the operation of the electric motor, and the other of said parts carrying a cam for sequentially operating said switches; and an electrical circuit for initiating the operation of the electric motor and for, responsive to said measuring means, terminating the operation of said electric motor when the measuring means detects a length of said spring as being indicative of the output force being of a required value.

2. An electric actuator as claimed in claim 1, wherein the electric motor controls the output force generated by the spring system by controlling the length of a spring of the system.

3. An actuator as claimed in claim 2, wherein the length of the spring is controlled by the electric motor through a pair of threadedly-engaged relatively-rotatable members rotation of one of which is effected by operation of the electric motor and consequential axial movement of the other determines the length of the spring.

4. An actuator as claimed in claim 2 wherein the spring which is controlled by said electric motor and to which said measuring means is responsive is a power spring which generates the output force and is the sole spring of the spring system.

5. An actuator as claimed in claim 2 wherein the spring which is controlled by said electric motor is a control spring and the spring to which said measuring means is responsive is a power spring, the control spring being arranged with respect to the power spring such that the force exerted by the control spring is subtracted from the force exerted by the power spring, the residual force exerted by the power spring being the output force.

6. An actuator as claimed in claim 1, wherein one of the parts is fixed in relation to one end of the spring and the other is adjustable in a direction towards and away from the one of the parts in relation to the other end of the spring.

7. An actuator as claimed in claim 6, wherein the actuator is a brake actuator of a vehicle and the said other of the parts of the measuring means may be adjustable in said direction in accordance with the load of the vehicle.

* * * * *